(12) United States Patent
Faust et al.

(10) Patent No.: US 11,960,550 B1
(45) Date of Patent: Apr. 16, 2024

(54) EMBEDDING-BASED RETRIEVAL TECHNIQUES FOR FEEDS

(71) Applicant: Microsoft Technology Licensing, LLC, Redmond, WA (US)

(72) Inventors: Francisco José Claude Faust, San Jose, CA (US); Ali Mohamed, San Jose, CA (US); Nisheedh Raveendran, Bellevue, WA (US); Namit Sikka, Los Altos Hills, CA (US); Siddharth Dangi, Palo Alto, CA (US); Birjodh Singh Tiwana, Dublin, CA (US); Adam Robert Peck, Redwood City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/974,220

(22) Filed: Oct. 26, 2022

(51) Int. Cl.
*G06F 16/00* (2019.01)
*G06F 16/2458* (2019.01)
*G06F 16/951* (2019.01)

(52) U.S. Cl.
CPC ........ *G06F 16/951* (2019.01); *G06F 16/2462* (2019.01)

(58) Field of Classification Search
None
See application file for complete search history.

(56) References Cited

U.S. PATENT DOCUMENTS

| | | | | |
|---|---|---|---|---|
| 8,015,190 B1 * | 9/2011 | Bayardo | ............ | G06F 16/3347 707/741 |
| 8,032,507 B1 * | 10/2011 | Bayardo | ............ | G06F 16/3347 707/706 |
| 8,041,694 B1 * | 10/2011 | Bayardo | ............ | G06F 16/3347 707/705 |
| 8,180,756 B1 * | 5/2012 | Bayardo | ............ | G06F 16/3347 707/706 |
| 8,275,771 B1 * | 9/2012 | Malpani | ................ | G06F 16/95 707/737 |
| 8,856,125 B1 * | 10/2014 | Malpani | ................ | G06F 16/95 707/737 |
| 2010/0306193 A1 * | 12/2010 | Pereira | ............... | G06F 16/7328 707/E17.014 |
| 2015/0302436 A1 * | 10/2015 | Reynolds | ............... | G06Q 10/06 705/7.32 |
| 2022/0300711 A1 * | 9/2022 | Elisco | ..................... | G06N 3/08 |

(Continued)

OTHER PUBLICATIONS

Wang, Y. (2022). A Survey on Efficient Processing of Similarity Queries over Neural Embeddings. arXiv preprint arXiv:2204.07922. (Year: 2022).*

(Continued)

*Primary Examiner* — Farhan M Syed
(74) *Attorney, Agent, or Firm* — Schwegman, Lundberg & Woessner, P.A.

(57) ABSTRACT

Described herein is a technique to facilitate filtering during candidate retrieval stage performed by an information retrieval system that utilizes embedding models. An aNN indexing structure is created for each end-user, and in some instances, each activity type. This allows a single request for candidate content items to invoke a single process to obtain content items that satisfy the filtering criteria (e.g., in this case, the in-network requirement) from the separate per-end-user indexes.

20 Claims, 8 Drawing Sheets

(56) References Cited

U.S. PATENT DOCUMENTS

2023/0119161 A1* 4/2023 Yadaw .................... G06F 40/30
 707/706
2023/0153700 A1* 5/2023 Lindgren ............ G06F 12/0875
 706/12

OTHER PUBLICATIONS

Bawa, M., Condie, T., & Ganesan, P. (May 2005). LSH forest: self-tuning indexes for similarity search. In Proceedings of the 14th international conference on World Wide Web (pp. 651-660). (Year: 2005).*

Pawar, Rutuja Shivraj. "An evaluation of deep hashing for high-dimensional similarity search on embedded data." Master's thesis, Otto von Guericke University Library, Magdeburg, Germany, 2019. (Year: 2019).*

"Manas HNSW Streaming Filters", Retrieved from: https://medium.com/pinterest-engineering/manas-hnsw-streaming-filters-351adf9ac1c4, May 5, 2022, 19 Pages.

* cited by examiner

EMBEDDING-BASED RETRIEVAL TECHNIQUES FOR FEEDS

TECHNICAL FIELD

The present application generally relates to information retrieval systems. More specifically, the present application relates to a technique to facilitate filtering during candidate retrieval by an information retrieval system that utilizes embedding models.

BACKGROUND

Information retrieval systems are implemented in a variety of ways and integrated with a wide variety of applications and services. For instance, information retrieval systems are implemented to provide search services, but are also used at the candidate selection stage to obtain relevant information for recommendation applications and services. By way of example, online dating websites utilize information retrieval systems to provide users with the ability to search for information relating to desirable people and to identify people for the purpose of generating recommendations relating to desirable people. Similarly, online social networking services use information retrieval systems to enable searching for information relating to other users and in many instances, to obtain and present content within a personalized data feed, sometimes referred to as a content feed, news feed, or simply a feed. These are just a few of the many applications and services that utilize information retrieval systems.

An information retrieval process typically begins with a query, which is a formal expression of the information needs. In many instances, the query may be a free text query for which a user specifies a combination of words, terms, or phrases to express the user's information needs. In the context of a candidate selection technique for a recommendation system, the query may be system generated. In any case, the information retrieval system processes the query against a collection of data or information to identify individual instances of information satisfying the query. In this context, the individual instances of data are frequently referred to as documents, but might also be referred to as data objects, or simply, items. In the context of an e-commerce site, an item may be a product listing, whereas, in the context of a feed application, an item may be a content item or content posting. For purposes of the present disclosure, the terms "item" and "content item" are used synonymously to reference the individual instances of data that make up the collective information repository or content collection that is accessed by an information retrieval system.

In the realm of information retrieval systems, filtering provides for the retrieval of items that satisfy filtering criteria or requirements. For example, in addition to specifying a query, in many instances, a search may also specify various filtering parameters that relate to specific properties of the items in the content collection. Filters are typically conjunctions of acceptable sets of values for the various properties of the items to be retrieved. For instance, in the context of a candidate selection technique for selecting items to present via a feed application, a search may be subject to filtering requirements specifying that the candidate items of interest are those items that have an association with another end-user who is in some way related to (e.g., connected to or followed by) the viewing end-user—the viewing end-user being the end-user to whom the items are to be presented. The specific manner in which a filtering feature is implemented with an information retrieval system will generally depend on a variety of factors relating to the information retrieval system and the specific application or service. However, in almost all instances, one requirement of any such filtering mechanism is that it be strictly applied. That is, when one or more filtering parameters are specified, the items retrieved and presented to a user by the information retrieval system must have property values that are consistent with the specified filtering parameters. For this reason, filters of this nature may be referred to as "hard" filters.

BRIEF DESCRIPTION OF THE DRAWINGS

Embodiments of the present invention are illustrated by way of example and not limitation in the figures of the accompanying drawings, in which.

DETAILED DESCRIPTION

Described herein are methods and systems for facilitating a filtering feature for use with an information retrieval system that utilizes an embedding-based candidate retrieval stage. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

The "In-Network Requirement" as Filtering Criteria

Figure 1A:
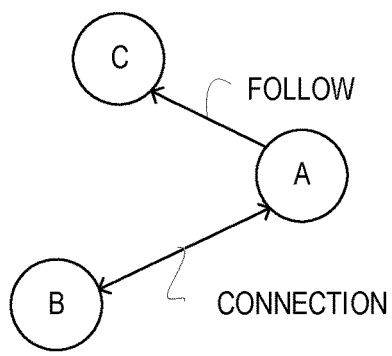
FIG. 1A is a diagram illustrating an example of a social graph, representing various relationships between end-users of an online system, consistent with embodiments of the present invention.

Many software applications and online services leverage a social graph to provide social features. For example, end-users may be prompted to identify other end-users as friends, co-workers, colleagues, and so forth, and then invite those end-users to memorialize their real-world relationship by forming a formal connection via the application or online service. Typically, a "connection" between two end-users is established when both end-users acknowledge and agree to the formation of the connection. In other instances, a first end-user may opt to "follow" a second end-user, without the second end-user formally and explicitly acknowledging the action of the first end-user. Therefore, as illustrated in FIG. 1A, in the context of a graph, a "connection" may be thought of as an edge connecting two nodes or vertices in an undirected graph, where each node or vertex represents an end-user. On the other hand—and again with reference to FIG. 1A—the act of "following" another end-user may be modeled as a directed graph, where the edge that connects two nodes or vertices has a direction to indicate which end-user is following, and which end-user is being followed. When one end-user follows another end-user, the end-user being followed (e.g., the end-user labeled as "C" in FIG. 1A) may be referred to as a "follow" of another end-user (e.g., end-user "A" as shown in FIG. 1A.)

One of the many applications that leverage a social graph is commonly known and referred to as a content feed, news feed, or more simply, a feed. In general, a feed is an application that has a user interface to present content items, which may include system-generated content items, user-generated content items, or a combination of both. When an end-user is viewing content items via a feed, the end-user may interact with the content items, for example, by "liking" a content item, providing commentary on a content item, or sharing a content item. For purposes of the present disclosure, each one of these content item interactions (e.g., comment, like, post, share) performed by an end-user is referred to as an "activity." In many instances, the content items that are system selected for presenting to a particular end-user are selected based in part on information from the social graph. Specifically, the content items that are selected for presenting to a first end-user are typically content items associated with another end-user who is a connection of the first end-user, or a follow of the first end-user—that is, an end-user whom the first end-user is following.

Figure 1B:
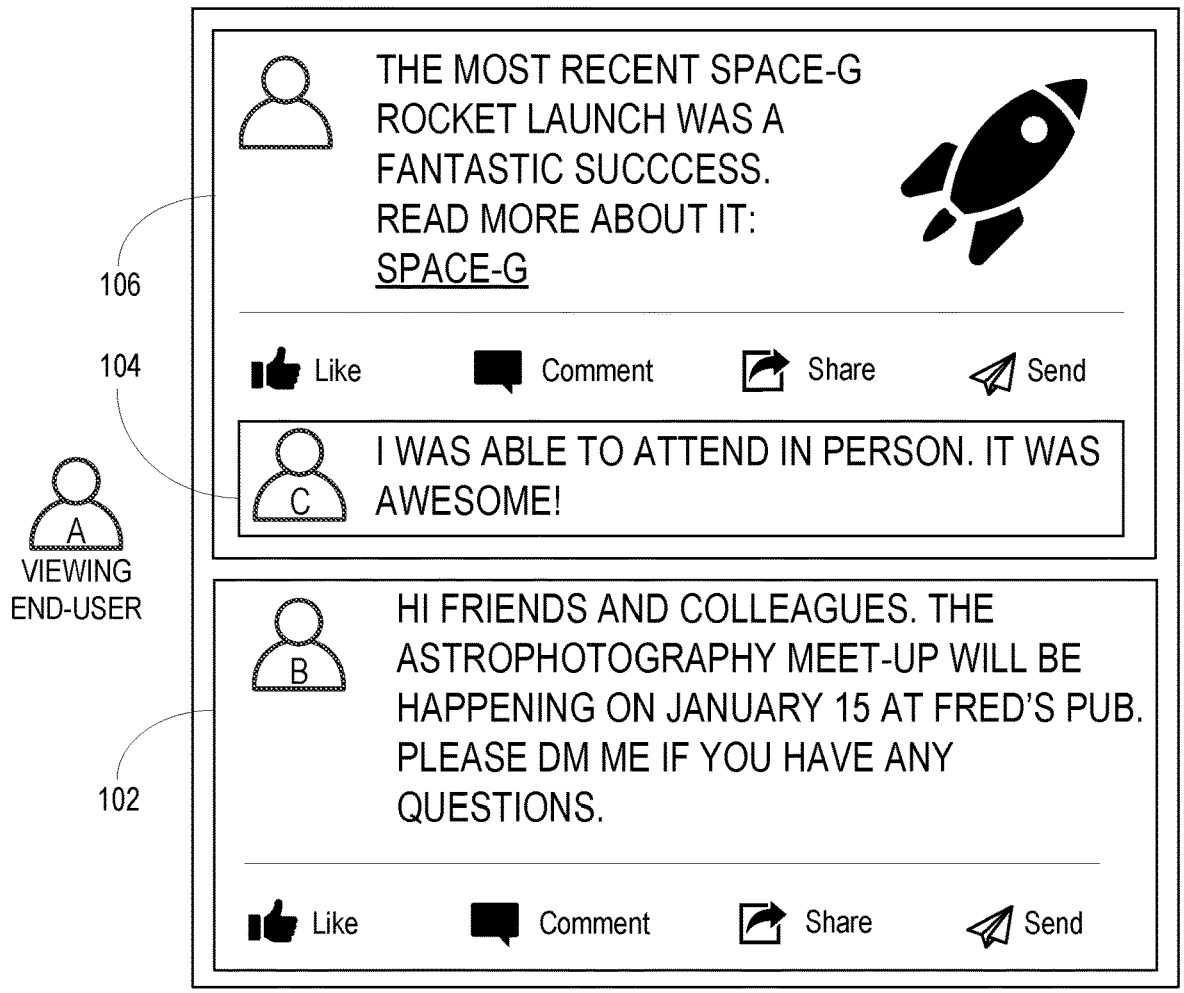
FIG. 1B is a user interface diagram illustrating an example of a user interface of a feed, in which items are presented to a viewing end-user, consistent with embodiments of the invention.

By way of example and as illustrated in FIGS. 1A and 1B, if a first end-user (e.g., end-user "A") is connected with a second end-user (e.g., end-user "B"), when the second end-user posts a content item via the feed, the content item becomes eligible for presentation to the viewing end-user (e.g., end-user "A"). This is illustrated in the example user interface of a feed as shown in FIG. 1B by the content item 102 posted by the end-user identified as end-user "B." Similarly, consider a scenario in which the viewing end-user—end-user "A" in this example—is following another end-user (e.g., end-user "C"). If the end-user identified as end-user "C" provides commentary 104 on a content item 106 that was posted or shared to the feed by another end-user, the content item and the commentary by end-user "C" may become eligible for presentation to end-user "A." From the perspective of any end-user, a content item that is in some way associated with a connection or follow of the end-user may be referred to as an "in-network" content item whereas a content item that is not associated with a connection or follow may be referred to as an "out-of-network" content item. Similarly, a feed that has an in-network requirement for selecting and presenting content items may be referred to as a follow feed.

As described in greater detail below, a number of technical challenges arise when approximate nearest neighbor search systems are used in searching for content items, when the search requirements specify that each content item satisfy some additional and specific requirement (e.g., filtering by a specific content item attribute), beyond that of being relevant, which, in the case of embedding-based retrieval systems, is a natural feature of the vectors and can be determined by a similarity function (e.g., distance between the vectors). For instance, in the context of selecting content items for presentation to an end-user of a feed, content items should be relevant (e.g., relating to a subject matter of interest to the end-user) and also satisfy the in-network requirement. The relevance of any content item is represented by the distance between the query vector (e.g., the embedding representing the end-user), and the embedding representing each content item, referred to herein as a content item embedding. Common measures of distance include the cosine distance and inner product. However, when using embedding-based retrieval for selecting candidate content items for a feed, the social graph information cannot be embedded within each embedding in a way that guarantees each content item embedding that is selected as a result of an approximate nearest neighbor search will also satisfy the in-network requirement.

Embedding-Based Information Retrieval Systems and Techniques

Many information retrieval systems are designed to process information in at least two separate stages—candidate selection (sometimes referred to as candidate retrieval) and ranking. The first stage involves what is commonly referred to as candidate selection or candidate retrieval, when a query, which is a formal expression of a user's information needs, is used to identify content items within a collection of such content items. The content items identified as a result of processing the query are often referred to as candidates, or candidate content items, in as much as some of the content items may be more or less relevant than others with respect to the information needs of the user. Accordingly, during the second stage of the information retrieval process, the candidate content items identified during the candidate retrieval stage are scored using a ranking algorithm. Finally, some number of the highest-ranking of the content items are presented in a user interface, ordered based on their ranking scores. For example, in the context of a feed application, the content items with the highest-ranking scores are typically presented in the most prominent position within the user interface of the feed.

Historically, the candidate retrieval stage has been implemented utilizing what are commonly referred to as term or token-based matching techniques. With term or token-based matching, during the candidate retrieval stage, words or terms expressed in the query are compared with or matched against the text of the individual content items to identify potentially relevant candidate content items. When the total number of content items in the collection is relatively small, term or token-based matching may involve full text searching, where the entire text of each item is scanned for query terms when processing a query. However, when the volume of content items in the collection is high, the text of each item may be pre-scanned to generate one or more search indexes. For instance, during an indexing stage, which occurs prior to processing a query, the entire text of each content item is scanned to build a list of search terms called a search index. A search index, specifically an inverted index or reverse index, maps terms present in the collection of content items to the specific content items in which those terms are present. Processing a query using one or more search indexes can significantly improve the speed and efficiency of retrieving relevant candidate content items, at the expense of the extra time and processing initially needed to generate the search indexes.

Information retrieval systems that utilize term or token-based matching techniques at the candidate retrieval stage have proven particularly useful. However, term or token-based matching techniques have shortcomings. It is often the situation that words have more than one meaning, and concepts may be expressed with combinations of different words. When candidate retrieval is based on term or token-based matching techniques, there is a possibility of returning content items with text that satisfies a query, but the meaning of the text does not satisfy the information needs of the user. Similarly, different terms are often used to express the same or a similar concept. As a result, some highly relevant items in the data collection may not be identified during the candidate retrieval stage as these items may include text that collectively expresses a concept relevant to a user's information needs, but do not include within the text the specific terms or words expressed in a search query.

More recently, information retrieval systems have been developed with candidate retrieval techniques that utilize what are referred to as semantic matching techniques. In the context of information retrieval systems, semantic matching techniques typically involve a concept known as representation learning, and more precisely, embeddings. An embedding is an encoding of the meaning of some raw data (e.g., text) into a real-valued vector, so that the vector representations of individual instances of the raw data will be similar, and thus close together in distance in the embedding space when the individual instances of raw data have a similar meaning. To use embeddings in the context of an information retrieval system, a learned vector representation (e.g., an embedding) is derived for each content item in the collection of items, using a first embedding model. For ease of reference, the embedding derived for a content item will be referred to herein as a content item embedding. A second embedding model is trained to derive learned vector representations of queries (e.g., query embeddings) in the same embedding space as that for content item embeddings. In the context of a feed application, where the objective is to identify content items of interest to a viewing end-user, the query embedding may be derived to represent the end-user, or the interests of the end-user. Accordingly, various attributes of an end-user—such as profile attributes and activity attributes —may be provided as input to a pre-trained, machine learned model to generate a query embedding that is representative of the end-user. Then, at inference time (e.g., when a query is being processed), the query embedding, corresponding with or representing the viewing end-user, is used in a similarity search to identify content item embeddings in the content item embedding space that are similar to the query embedding. For example, the query embedding may be used as an input to a "k" approximate nearest neighbor ("k-ANN") algorithm to identify some number ("k") of content items having content item embeddings that are similar to the query embedding. Here, similarity is represented as the distance between two embeddings. Typical measures of distance include the cosine distance or the inner product of the two vectors. Information retrieval systems that utilize embeddings in this manner may be referred to as embedding-based information retrieval systems.

Embedding-based information retrieval systems provide a significant advantage over those that utilize term or token-based matching, in that embedding-based retrieval systems allow for the retrieval of items from a content collection based on semantic matching of the query, without relying on an exact word match as is required with term or token-based matching techniques. Furthermore, some implementations of k-ANN algorithms utilize similarity scoring functions to assess the similarity of the query and item embeddings that are highly efficient in terms of their computational expense and have excellent recall or retrieval time performance. By way of example, some implementations of k-ANN algorithms implement similarity scoring functions that are based on techniques that utilize proximity graphs, with each item represented in the proximity graph being connected with other items that have a similar vector representation. In this context, a similarity search is processed by a walk in the proximity graph, which keeps moving towards items that are the most similar to the query embedding. Many of these proximity graph techniques use the inner product of the respective query and item embeddings as the similarity metric to both construct the proximity graph and to execute the search for items.

However, one significant problem that arises from using embedding-based information retrieval systems at the candidate retrieval stage is that embedding-based retrieval systems do not support the ability to filter content items at the candidate retrieval stage. For example, because the vector representations of the query and items are lower dimensional representations, the similarity scoring techniques used with embedding-based information retrieval systems do not provide the level of precision required to guaranty that content items will, or will not, have certain property values satisfying filtering parameters associated with the query. Attempting to improve the accuracy of the learned embedding models to support the strict requirements of filtering necessarily increases the overall complexity of the embedding models, tends to increase the parameter space of the embedding models, and increases the amount of data needed to train the embedding models. Furthermore, even with such efforts to improve the embedding models, the selection of appropriate content items based on filtering parameters cannot be guaranteed at the candidate retrieval stage. Some content items having property values that do not satisfy the user-specified filtering parameters would likely still be retrieved.

Because filtering is not natively supported within the existing framework and architecture of many embedding-based information retrieval systems, a variety of alternative solutions have been developed. Many of these alternative solutions support filtering through reliance on complex "hybrid" systems that combine the use of k-ANN algorithms with inverted indexes, and/or less efficient similarity scoring models that utilize techniques such as product quantization. These hybrid solutions significantly increase the complexity of an information retrieval system, making such a system more expensive to engineer, develop and maintain. For instance, the inverted indexes used in some of these hybrid systems require additional memory storage and effort to build, rebuild, and maintain, and the inference latency and computational cost suffer significantly because less-efficient implementations of k-ANN algorithms must be used, including those that implement similarity scoring techniques using product quantization.

In the context of candidate selection or candidate retrieval for a feed application, given the need to find both relevant content items, and content items that satisfy the in-network requirement, most conventional k-ANN systems operate in one of two ways, as described below in connection with FIGS. 2 and 3. Specifically, the first approach involves performing an approximate nearest neighbor search, first, and then filtering out those search results (e.g., content items) that do not satisfy specific filtering criteria (e.g., the in-network requirement).

Figure 2:
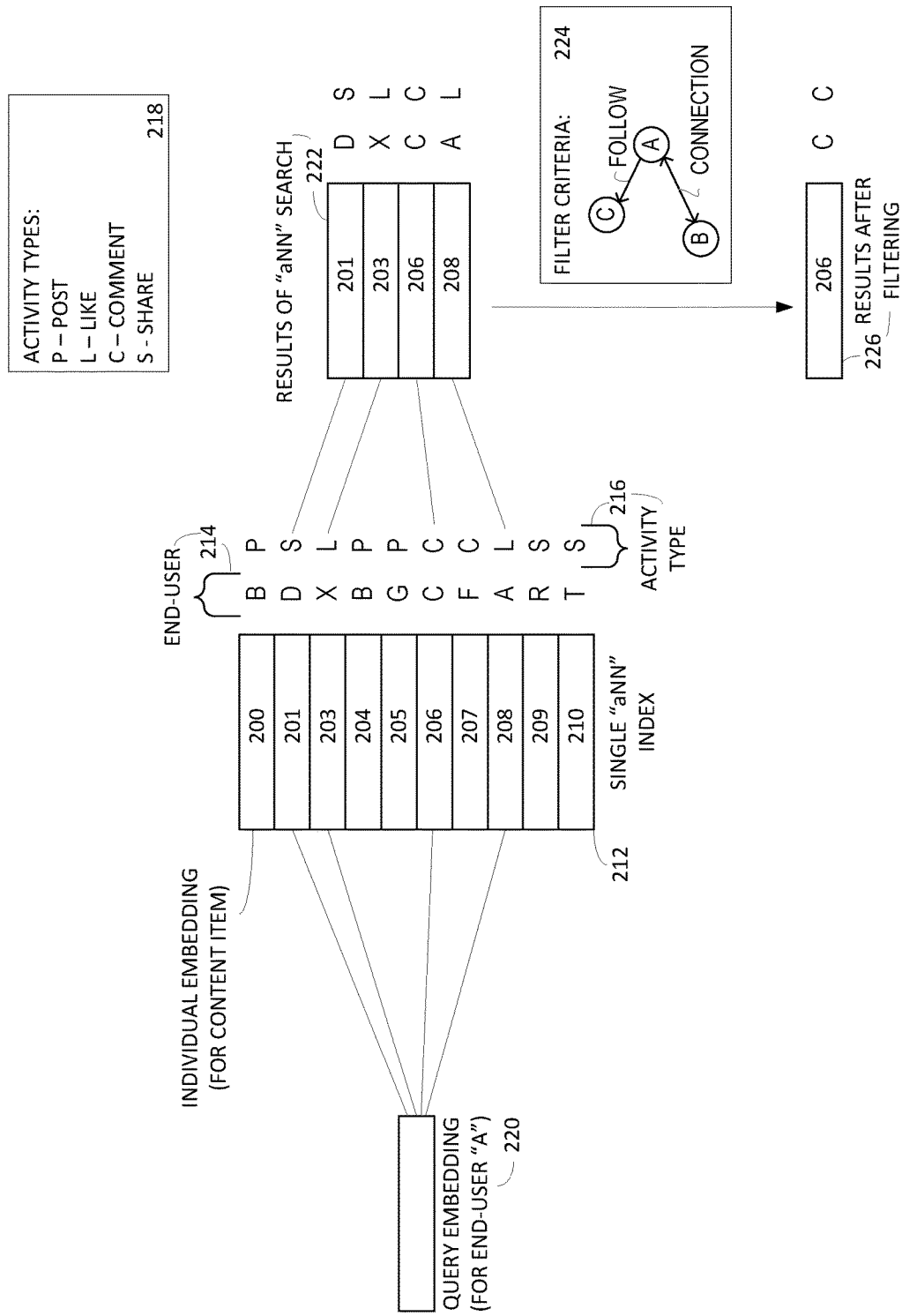
FIG. 2 is a diagram illustrating an example of a conventional candidate selection technique that utilizes an approximate nearest neighbor search, followed by a filtering step, to identify relevant items that also satisfy specific filtering criteria (e.g., an in-network requirement)

For instance, as shown in FIG. 2, a single approximate nearest neighbor index 212 is presented with reference number 212. All content items are represented as embeddings (e.g., with reference numbers 200 through 210) and organized within the single index 212 for efficient search and retrieval. The first column of letters 214 to the right of the index 212 indicates the identity of the end-user associated with a corresponding content item, while the second column 216 indicates the type of a corresponding activity. The content item 200 shown at the very top of the index 212 is associated with the letters, "B" and "P", indicating that the end-user identified as end-user "B" is responsible for having posted (e.g., "P" is for post) the content item to the feed. As indicated by the legend 218, for purposes of this example, other activity types include: "L" for liking a content item, "C" for commenting on a content item, and "S" for sharing a content item. Typically, this information (e.g., the end-user 214 associated with a content item and the activity type 216) would be maintained in separate indexes, adding to the overall complexity of developing and maintaining the system.

When an end-user—for example, the end-user identified as end-user "A"— invokes a request to view his or her feed, a query embedding 220 representing end-user "A" is used to search for some number of content item embeddings in the index 212 that are close in distance to the query embedding. In this simplified example, the lines connecting the query embedding 220 to the index 212 identify four content item embeddings (e.g., content items 201, 203, 206 and 208) close in distance to the query embedding 220. These content item embeddings (e.g., content item embeddings 201, 203, 206 and 208) are returned as the results of the ("k=4") approximate nearest neighbor search 222.

In order to identify the content items that satisfy the in-network requirement 224, the results 222 of the approximate nearest neighbor search are filtered to exclude those that are not associated with a connection or follow of end-user "A." For instance, the filter criteria 224 indicate that end-user "C" is a follow of end-user "A" and end-user "B" is a connection of end-user "A." Accordingly, candidate content items that satisfy the search parameters will be associated with one of end-users "B" or "C." After applying the filtering criteria, the results 226 include a single content item embedding 206 for a content item on which end-user "C" has provided commentary.

This example illustrates some of the many problems with this hybrid approach, which may be characterized as ("aNN+Filter") to indicate that the approximate nearest neighbor search is performed first, followed by a filtering step to identify content items that satisfy the filtering criteria (e.g., the in-network requirement). Specifically, one problem with this approach is that the content items that are ultimately the most relevant and thus returned as a result 222 of the approximate nearest neighbor search tend to be out-of-network content items that do not satisfy the in-network requirement. For instance, in this simplified example having k=4, only one of the four content items returned as a result of the approximate nearest neighbor search is a content item associated with one of end-users "B" or "C" (the filtering requirement). Consequently, using this approach, in order to generate a sufficient number of candidate content items to pass on to the ranking algorithm of the ranking stage, the approximate nearest neighbor search must return a large number of results in order to have a sufficient number of candidate content items remaining after the filtering step is applied. This problem is exacerbated when the size of the network (e.g., number of follows and connections in the social graph) increases to be a large number, as is often the case with many online services that have multi-millions of end-users. Furthermore, implementing a system such as that shown in FIG. 2 generally requires developing and maintaining multiple indexes—for example, a first aNN index for searching the content item embeddings, and then one or more additional indexes for searching for information related to the content item embeddings, such as the information identifying the specific end-user 214 who may have posted, liked, commented on, or shared 216 the content item.

Figure 3:
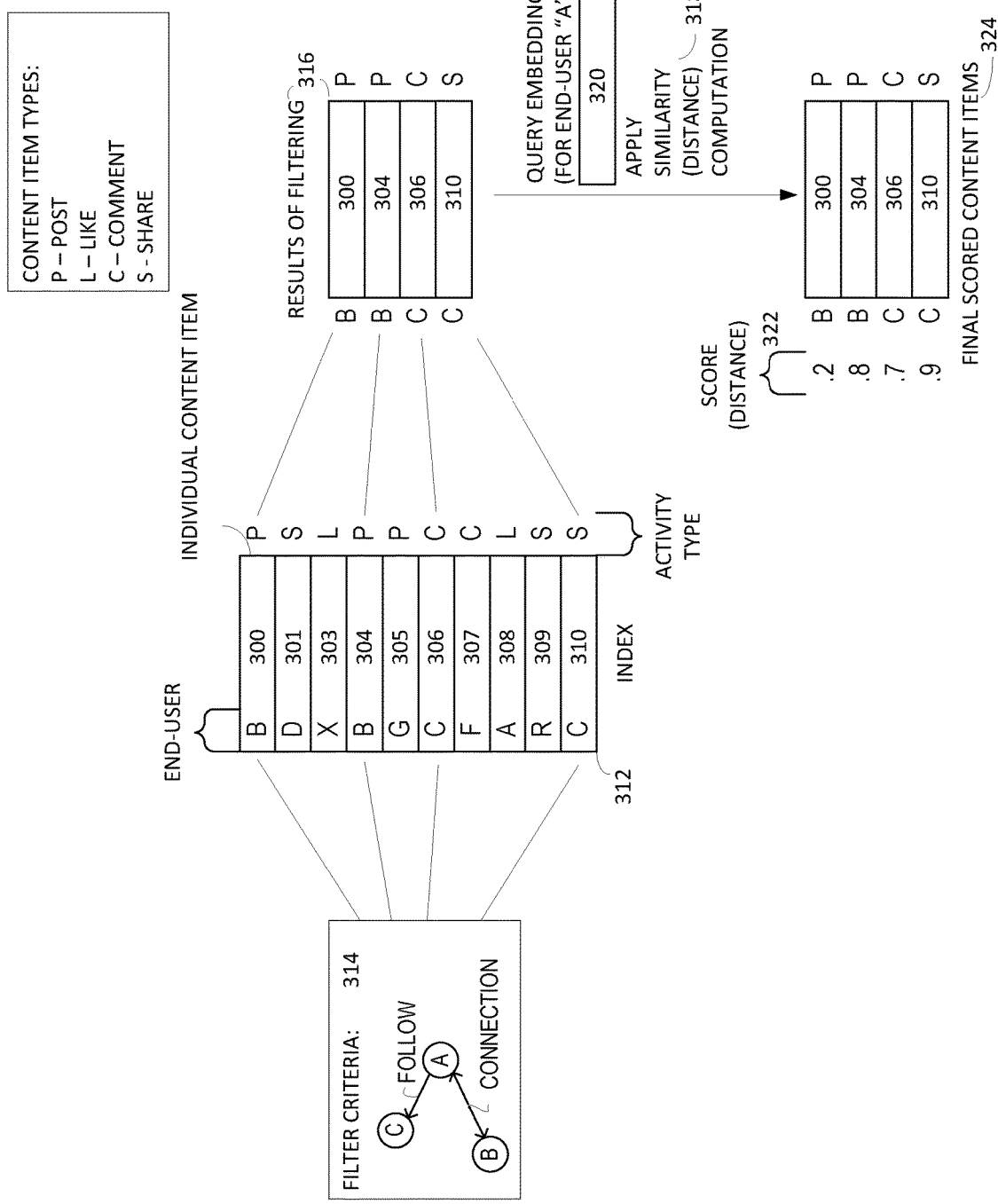
FIG. 3 is a diagram illustrating an example of a conventional candidate selection technique that first applies a filtering step to identify items meeting specific criteria (e.g., an in-network requirement), and then computes a similarity score for each item selected during the filtering step.

Turning now to FIG. 3, a second approach involves applying the filtering criteria first, to select candidate content items that satisfy the in-network requirement, and then computing the distance between a query embedding and each content item embedding, in order to identify the most relevant content items in the set of filtered content items. This approach might be characterized as, ("Filter+aNN") to reflect the order of operations—filter applied first, followed by the computation of distances between embeddings. As illustrated in FIG. 3, a single index is presented with reference number 312. The content items (e.g., 300 through 310) are arranged within the index so that they can be easily retrieved by reference to the end-user—that is, the end-user associated with the content item by virtue of having posted the content item, liked the content item, commented on the content item, or shared the content item.

In this example, the filtering criteria 314 (e.g., the in-network requirement) is applied first, to select the content items from the index 312 that satisfy the filtering criteria 314. For example, as shown in FIG. 3, the filtering criteria indicates that end-user "A" is following end-user "C" and is connected to end-user "B." Therefore, the content items that will satisfy the in-network requirement are those content items associated with end-users "B" or "C." As a result 316 of the filtering step, four content items are selected (e.g., content items with reference numbers 300, 304, 306, and 310).

Next, as shown with reference 318, for each content item that is in the set of content items 316 resulting from the filtering step, a relevance or similarity score is computed. For instance, for each content item in the set 316, the distance between the content item embedding for the content item and the query embedding 320, representing the viewing end-user, is computed. As shown with reference 322, the final result is a set of scored content items 324 satisfying the filtering criteria (e.g., the in-network requirement).

This approach, as illustrated in FIG. 3, has several problems. First, at the filtering stage, when the filtering criteria (e.g., the in-network requirement) is being applied, there is no sense of relevance. Accordingly, there is no way to know how many content items need to be selected, based on the filtering criteria, in order to ensure a reasonable number of relevant candidate content items. Furthermore, as a network grows and more and more connections are established in the corresponding social graph, the time and computing resources required to identify all candidate content items satisfying the filtering criteria grows as well, hurting performance. If a viewing end-user has a large network, it may be the case that an extremely large number of content items are identified at the filtering stage, with no guaranty that any of the content items are relevant. Second, once a large set of content items satisfying the filtering criteria has been identified, a distance between the content item embedding and the query embedding must be computed for each and every content item in the set, thereby eliminating the efficiency advantages typically obtained through approximate nearest neighbor search algorithms.

Improved Embedding-Based Retrieval Technique

Described herein is an improved candidate retrieval or candidate selection technique that leverages embedding-based retrieval. Consistent with embodiments of the present invention, an aNN indexing structure is created for each end-user, and in some instances, each activity type. For instance, whereas the example presented in connection with FIG. 2 involved a single aNN index 212 for all content item embeddings, regardless of the associated end-user or activity type, consistent with embodiments of the present invention, individual aNN indexes are created for each end-user, and optionally, each activity type. This allows a single request for candidate content items to invoke a single process to obtain content items that satisfy the filtering criteria (e.g., in this case, the in-network requirement) from the separate per-end-user indexes.

By way of example, consistent with embodiments of the invention, a request for candidate content items will include a query embedding representing the viewing end-user, and an end-user identifier for each connection or follow of the viewing end-user. As the content item embeddings are indexed separately, by end-user, an aNN search algorithm can be invoked to search only those indexes that correspond with an end-user who is a connection or follow of the viewing end-user. In this way, the filtering and relevance criteria are combined in a single retrieval process. Furthermore, as the overall architecture of the embedding-based retrieval technique is independent of the embedding models—that is, the machine learning models deployed to learn the representations of the content items and the end-users—it is possible to iteratively improve the overall system through modifications to the embedding models, without impacting the overall architecture and the function of the overall system. This approach is simpler, from a development and maintenance perspective, as well as more efficient, and perhaps most importantly, more scalable. Other advantages of the present invention will be readily apparent from the description of the several figures that follow.

Figure 4:
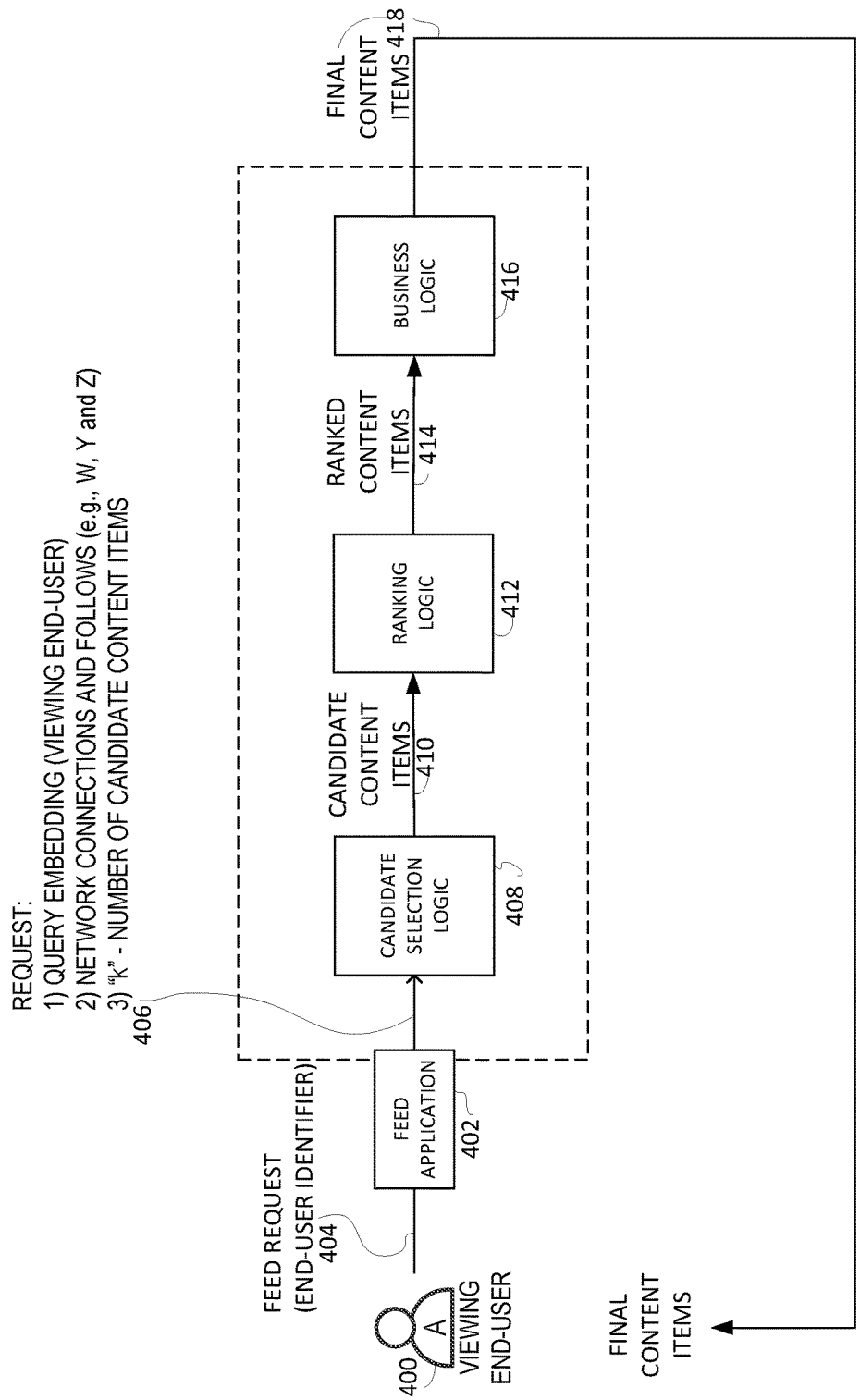
FIG. 4 is a diagram illustrating an example of a data processing pipeline used by a feed application to generate candidate items, rank the candidate items, and select some subset of candidate items for presentation to a viewing end-user, according to some embodiments of the present invention.

FIG. 4 is a diagram illustrating an example of a data processing pipeline used by a feed application to generate candidate content items, rank the candidate content items, and select some subset of candidate content items for presentation to a viewing end-user, according to some embodiments of the present invention. As illustrated in FIG. 4, an end-user (e.g., viewing end-user "A" 400) may access a feed application 402 of an online service through a mobile application, desktop application, or a web browser application. When the end-user 400 initially invokes the feed application 402, a request 404 is received at the online service identifying the end-user. The feed application 402 of the online service processes the initial request 404 by generating a secondary request that is directed to the candidate selection logic 408.

Consistent with some embodiments, the initial request 404 may be processed by obtaining various information about the end-user, in order to generate the secondary request 406 that is directed to the candidate selection logic 408. By way of example, the end-user identifier, identifying the viewing end-user, may be used to obtain a query embedding for the viewing end-user. In some instances, a query embedding representing each end-user may be periodically generated and stored, such that the query embedding for the viewing end-user can simply be retrieved from storage when needed. Alternatively, with some embodiments, a query embedding for the viewing end-user may be generated synchronously, for example, upon or in response to receiving the initial request 402 to access the feed application. In any case, the query embedding, representing the viewing end-user, is a vector representation of the viewing end-user that can be used as a query by an approximate nearest neighbor search algorithm. The query embedding is created in the same embedding space as the content item embeddings, such that the distance between the query embedding and any individual content item embedding is representative of the similarity between the viewing end-user and the content item. In general, the inputs to the pre-trained machine learned model used in generating the query embedding may include profile attributes of the viewing end-user, as well as activity attributes. For instance, activity attributes may be attributes relating to the viewing end-user's recent activity (e.g., click data, search terms used) at the online service.

In addition to obtaining a query embedding for the viewing end-user, the end-user identifier of the viewing end-user may be provided, as input, to a social graph service (not shown) to obtain a list of end-user identifiers for those end-users of the online service who are connections or follows of the viewing end-user. The secondary request 406, including the query embedding (corresponding with the viewing end-user), a list of end-user identifiers for those end-users who are connections or follows of the viewing end-user, and a number "k" indicating the number of requested candidate content items, is communicated to the candidate selection logic 408.

The candidate selection logic 408 utilizes the query embedding to obtain candidate content items from each aNN index associated with a connection or follow of the end-user, as indicated in the secondary request 406. Because the content item embeddings are grouped together in an aNN index by end-user, an aNN search need only be performed on those indexes associated with an end-user who is a connection or follow of the viewing end-user. By structuring the indexes on a per end-user basis, the combination of applying the filtering criteria (e.g., the in-network requirement) and the searching for relevant content items (e.g., content item embeddings closest in distance to the query embedding) can be obtained with a single retrieval process. Further details of the content selection stage are described below in connection with FIG. 5.

After the candidate selection logic 408 has obtained the predetermined number "k" of candidate content items 410, the candidate content items are provided to the ranking logic 412. The ranking logic 412 utilizes various meta-data relating to the viewing end-user, the connections and follows, as well as the content items themselves, to generate for each content item a score. Then, some subset of the scored or ranked content items 414 are processed by the business logic 416 before the final content items 418 are presented in a user interface to the viewing end-user 400. By way of example, the business logic 416 may manipulate the final rankings of some content items to impact the final position of one or more content items when presenting the content items to the viewing end-user. This may be done, for example, to ensure some measure of diversity with respect to the presentation of the content items.

Figure 5:
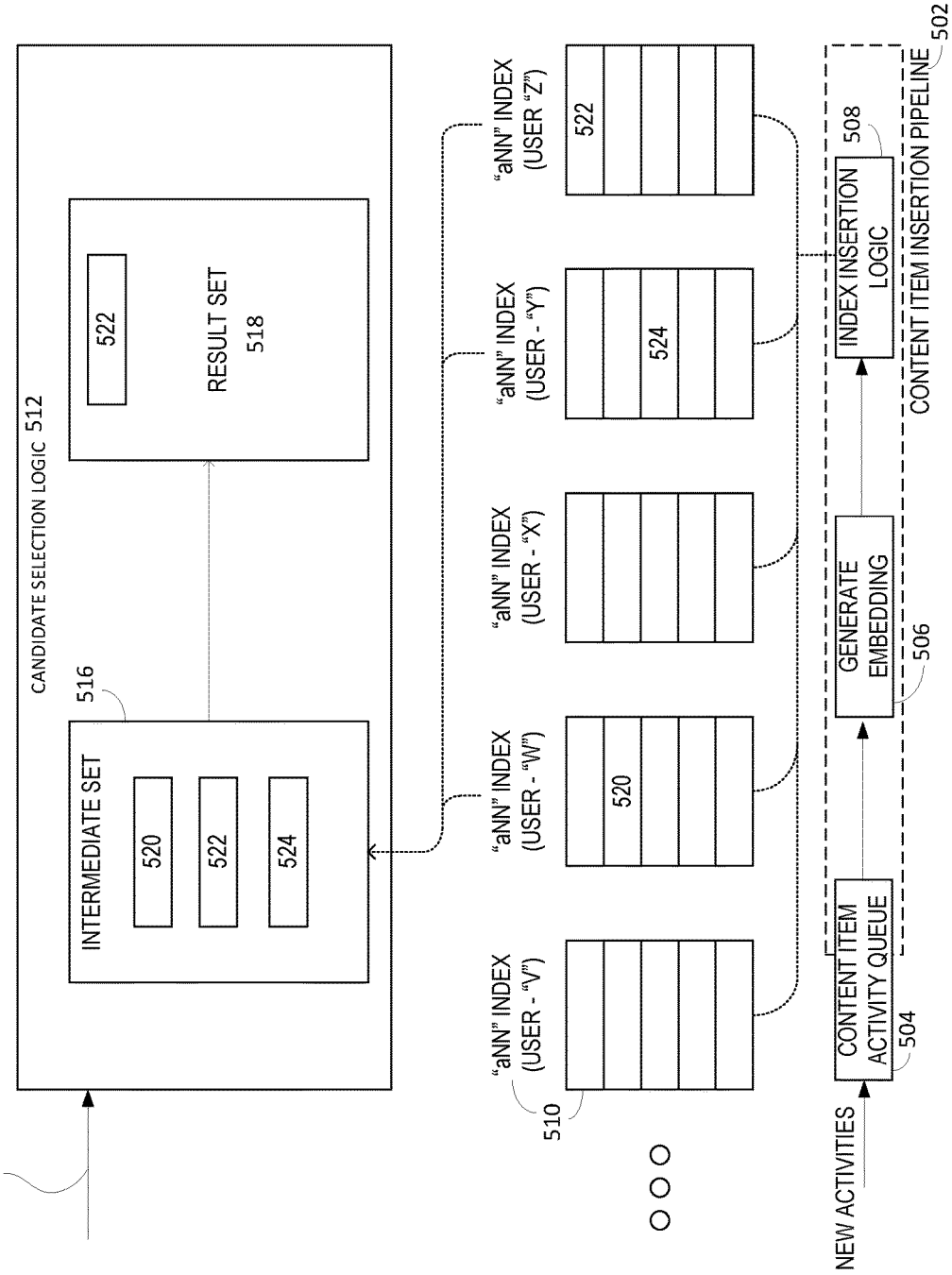
FIG. 5 is a diagram illustrating an example of an improved approximate nearest neighbor system for selecting candidate items that are both relevant (as determined by a distance between embeddings), and satisfy additional filtering criteria (e.g., an in-network requirement), according to an embodiment of the invention.

FIG. 5 is a diagram illustrating an example of an improved approximate nearest neighbor system for selecting candidate content items that are both relevant (as determined by a distance between embeddings), and satisfy additional filtering criteria (e.g., an in-network requirement), according to an embodiment of the invention. As shown in FIG. 5, a content item insertion pipeline 502 is used to add new content items to various aNN indexes, on a per end-user basis, as new activities occur. Here, an activity is an event relating to a content item that involves an end-user and an activity type. For example, when an end-user posts a content item to the feed application, this is a new activity having the activity type, "posting." Similarly, when an end-user "likes" a content item that appears in his or her feed, this is a new activity of activity type, "like." Accordingly, each activity involves a content item (e.g., the text, photos, video, links, and so forth) as well as an actor (e.g., the end-user who took some action) and an activity type. While the various activity types may vary, with some embodiments, the activity types may include any one or any combination of: posting, liking (or, reacting), commenting, sharing, mentioning, connecting, and following.

For purposes of the present disclosure, the terms "like" and "liking"—as in, "liking" a content item—are synonymous with "react" or "reacting" and are to be broadly construed to include actions that allow the end-user to associate with a content item any of a number of expressions of emotions or sentiments. For instance, with many feed applications, a "like" button or "react" button may allow an end-user to associate an expression of emotion or sentiment with a content item by selecting a specific labeled button or icon that is specific to a particular expression of emotion or sentiment. By way of example, some "like" buttons may include expressions relating to dislike (e.g., a downward pointing thumb icon), happiness (e.g., an icon of a smiley face), sadness (e.g., a frowning face), and many others. Accordingly, with some embodiments, each individual expression of emotion or sentiment associated with a content item may be a separate activity type. As these new activities occur via the feed application, all of the relevant information concerning the activity and the corresponding content item are added to a content item activity queue 504.

Content item activities are processed from the content item activity queue 504 by first generating a content item embedding 506 for the content item. Generally, this involves providing various information about the content item as input to a pretrained machine learned model, which generates as output the content item embedding. Then, index insertion logic 508 inserts the content item embedding into the appropriate aNN index. Here, the appropriate aNN index is the aNN index associated with the end-user who performed the action relating to the content item. For example, and as shown in shown in FIG. 5, separate indexes are created for each end-user of the online system who performs an activity associated with a content item. Accordingly, with reference to FIG. 5, if the end-user identified as end-user "V" posts a content item to the feed, the content item embedding for the content item posted by end-user "V" will be added to the aNN index 510 for end-user "V." While FIG. 5 shows indexes for five individual end-users (e.g., end-users "V," "W," "X," "Y," and "Z"), it will be readily appreciated that an index may be created for any and all end-users who have interacted with a content item via the feed application.

When the candidate selection logic 512 receives a request 514 to generate a set of candidate content items—for example, as a result of a viewing end-user invoking a request to view his or her personalized feed—the request 514 may include a query embedding, representing the viewing end-user, a list of end-user identifiers associated with end-users who are either connections or follows of the viewing end-user, and a number (e.g., "k") indicating the number of candidate content items to be obtained and passed on to the ranking logic.

The objective of the candidate selection logic 512 is to create the result set 518, which represents the complete list of candidate content items, ordered by their respective similarity scores. For example, the first candidate content item in the result set 518 will be the candidate content item having a corresponding content item embedding closer in distance to the query embedding than all other content item embeddings. Similarly, the second content item in the final result set will be the content item having the corresponding content item embedding that is second closest to the query embedding, and so forth.

To obtain the candidate content items for the result set 518, the aNN searching can be restricted to the indexes that are associated with the connections and follows of the viewing end-user. For instance, in the example shown in FIG. 5, the request 514 indicates that the connections and follows of the viewing end-user are identified as end-users "W," "Y," and "Z." Accordingly, the relevant candidate content items are those content items associated with and stored in aNN indexes for the end-users "W," "Y," and "Z", and thus only the aNN indexes corresponding with those end-users are relevant for purposes of performing the aNN search.

To generate the result set 518, the candidate selection logic 512 first obtains the highest scoring (closest in distance) content item embedding from each aNN index associated with a connection or follow of the viewing end-user. For instance, the candidate selection logic 512 provides the query embedding to the aNN index for end-user "W" and receives in return the content item embedding in the index for end-user "W" that is closest in distance to the query embedding. For purposes of this example, the closest content item embedding is shown with reference number 520. The content item embedding 520 is shown as having been retrieved from the index for end-user "W" and placed in the intermediate set 516. The content selection logic 512 retrieves a single content item embedding from each of the aNN indexes associated with a connection or follow of the viewing end-user. More specifically, for each of the relevant aNN indexes, the content selection logic obtains or retrieves the content item embedding that is closest to the query embedding. In this example, the content item embeddings 520, 522 and 524 have been selected as the content item embeddings closest in distance to the query embedding, from each of the three aNN indexes for end-user's "W," "Y," and "Z." Although not shown in FIG. 5, in addition to the content item embedding, the similarity score—that is, the distance between a content item embedding and the query embedding—is returned by the index and stored in the intermediate set with the corresponding content item embedding.

Next, once the intermediate set 516 includes one content item embedding from each of the relevant aNN indexes, the content item embedding in the intermediate set with the overall highest similarity score is selected for placement in the result set 518. For purposes of the example in FIG. 5, the one content item embedding having the highest similarity score amongst content item embeddings 520, 522 and 524 is selected for placement in the result set 518. In this example, the content item embedding 522 is determined to be the most similar to the query embedding, and is thus shown at the top of the list in the result set 518.

After the content item embedding 520 has been moved from the intermediate set 516 to the result set 518, the candidate selection logic 512 will select another content item embedding from the aNN index for the content item that was most recently moved to the result set. For instance, after a first iteration, because the content item embedding 522 was placed in the result set, and because content item embedding 522 was initially selected from the aNN index for end-user "Z," the candidate selection logic 512 will select the next closest content item embedding from the aNN index for end-user "Z" and place the selected content item embedding in the intermediate set 516. Once the intermediate set 516 includes a content item embedding from each of the relevant aNN indexes, the content item embedding with the highest similarity score is selected for placement in the result set 518. This process is then iteratively repeated until the number of content items placed in the result set 518 is equal to the number "k" as specified in the request 514.

Consistent with some embodiments, the intermediate set 516 may be implemented with an abstract data-type known as a priority queue. Similar to a queue, a priority queue supports operations to add or insert elements and serve or return elements. For instance, an insert operation is used to add a content item to the priority queue, while a serve operation (sometimes referred to as a "pop" or "push" operation) involves removing a content item from the priority queue. However, whereas a queue operates on a first-in, first-out principle, each element that is inserted into a priority queue is positioned and served or pushed based on a priority value assigned to the element. Referring again to the example presented in FIG. 5, each content item embedding, corresponding with a content item, is placed in a priority queue, where the similarity score (e.g., the distance between the content item embedding and the query embedding) is the priority value for the content item embedding. Accordingly, after three insertion operations, three content item embeddings are placed in the priority queue, ordered by their respective similarity scores. Then, when a serve or push operation is performed to remove an element (e.g., a content item) from the priority queue, the first content item embedding pushed or served from the priority queue will be the element with the highest priority value (e.g., the highest similarity score, representing the smallest or shortest distance).

It should be noted that the indexes shown and described in the example presented in connection with FIG. 5 have been described as approximate nearest neighbor ("aNN") indexes. In contrast with nearest neighbor indexes, search algorithms for searching approximate nearest neighbor indexes may not consider every content item embedding in the index, and thus do not guaranty that the content item embedding that is the actual closest to the query embedding is returned as a result. With some embodiments, particularly when the total number of content items stored in any given index is low, a nearest neighbor index and nearest neighbor search algorithm might be used.

Those skilled in the art will appreciate that any of several well-known nearest neighbor index structures might be implemented and deployed with various embodiments of the present invention. With some embodiments, aNN indexes and search algorithms that support the concept of streaming are advantageously deployed. In the context of nearest neighbor search, streaming is the capability of iteratively returning the next nearest item from the index. For example, after a first request is processed by the index, a subsequent request for the next nearest item will result in returning the item that is next closest to the query embedding, relative to the first item that was returned by the index. The index structures may include those that utilize bucketing, hashing and graph-based techniques. Some specific examples include IVFPQ and HNSW.

Because each index is created on a per end-user basis, the nearest neighbor search can be limited to only those indexes associated with end-users who are in the network (e.g., connections of follows) of the viewing end-user. Furthermore, as the indexes support moving to the next closest content item embedding iteratively, only relevant (e.g., close) content item embeddings are ever accessed. Furthermore, because content items are grouped by end-user, when the number of content items selected from one index (e.g., associated with one end-user) reaches some threshold level, that index can be dropped from the priority queue, such that content items from that index are not added back into the priority queue, thereby resulting in a more diverse set of candidate content items.

Figure 6:
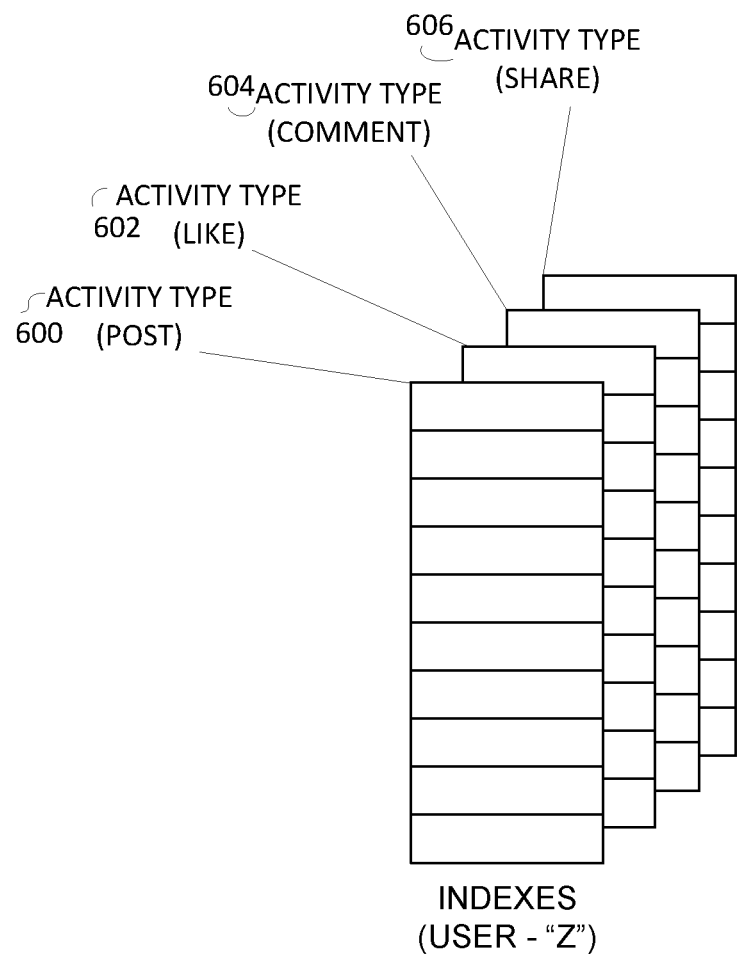
FIG. 6 is a diagram illustrating an example of an indexing structure for which items are grouped by end-user and by activity type, consistent with some embodiments of the invention.

FIG. 6 is a diagram illustrating an example of an indexing structure for which content items are grouped by end-user and by activity type, consistent with some embodiments of the invention. With some embodiments, content item embeddings may be organized by both end-user and by activity type. For example, as shown in FIG. 6, four separate indexes are shown. All of the content item embeddings in the four indexes are associated with the end-user identified as end-user "Z." However, each individual index is for one of four different activity types. For example, the index with reference number 600 is for content items that have been posted by end-user "Z." The index 602 is for content item embeddings associated with content items that have been liked by end-user "Z." The index 604 is for content items for which end-user "Z" has commented. And the index 606 is for content items that have been shared by end-user "Z."

By indexing content items by end-user and activity type, the content selection logic can apply additional business logic to the candidate selection algorithm for purposes of ensuring diversity of content items at the candidate selection stage. For example, the candidate selection logic may implement rules to balance or limit the number of content items associated with certain end-users, and/or certain activity types.

Figure 7:
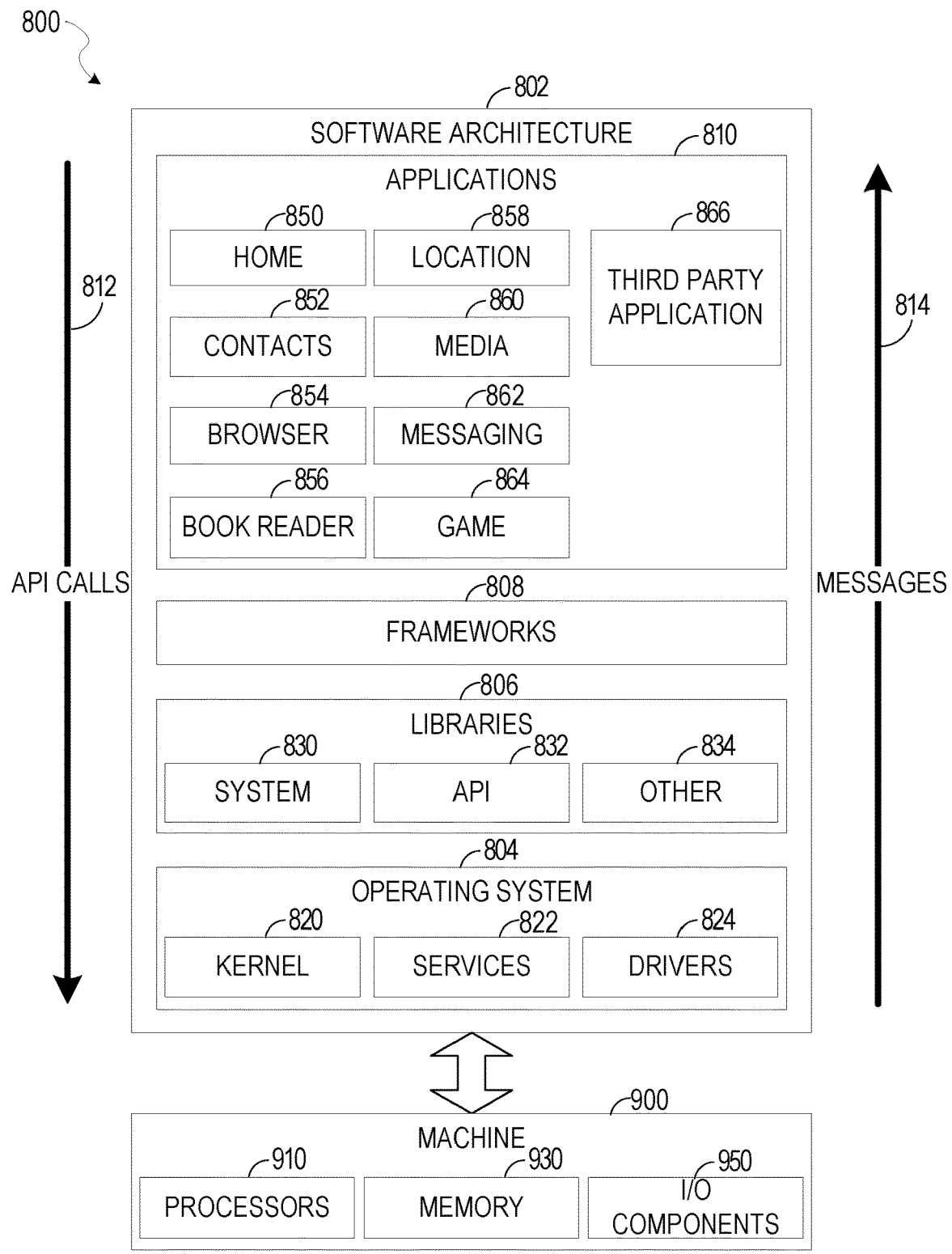
FIG. 7 is a block diagram illustrating a software architecture, which can be utilized with any of a variety of computing devices to perform methods consistent with those described herein.

FIG. 7 is a block diagram 800 illustrating a software architecture 802, which can be installed on any of a variety of computing devices to perform methods consistent with those described herein. FIG. 7 is merely a non-limiting example of a software architecture, and it will be appreciated that many other architectures can be implemented to facilitate the functionality described herein. In various embodiments, the software architecture 802 is implemented by hardware such as a machine 900 of FIG. 8 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke API calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 608 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 8:
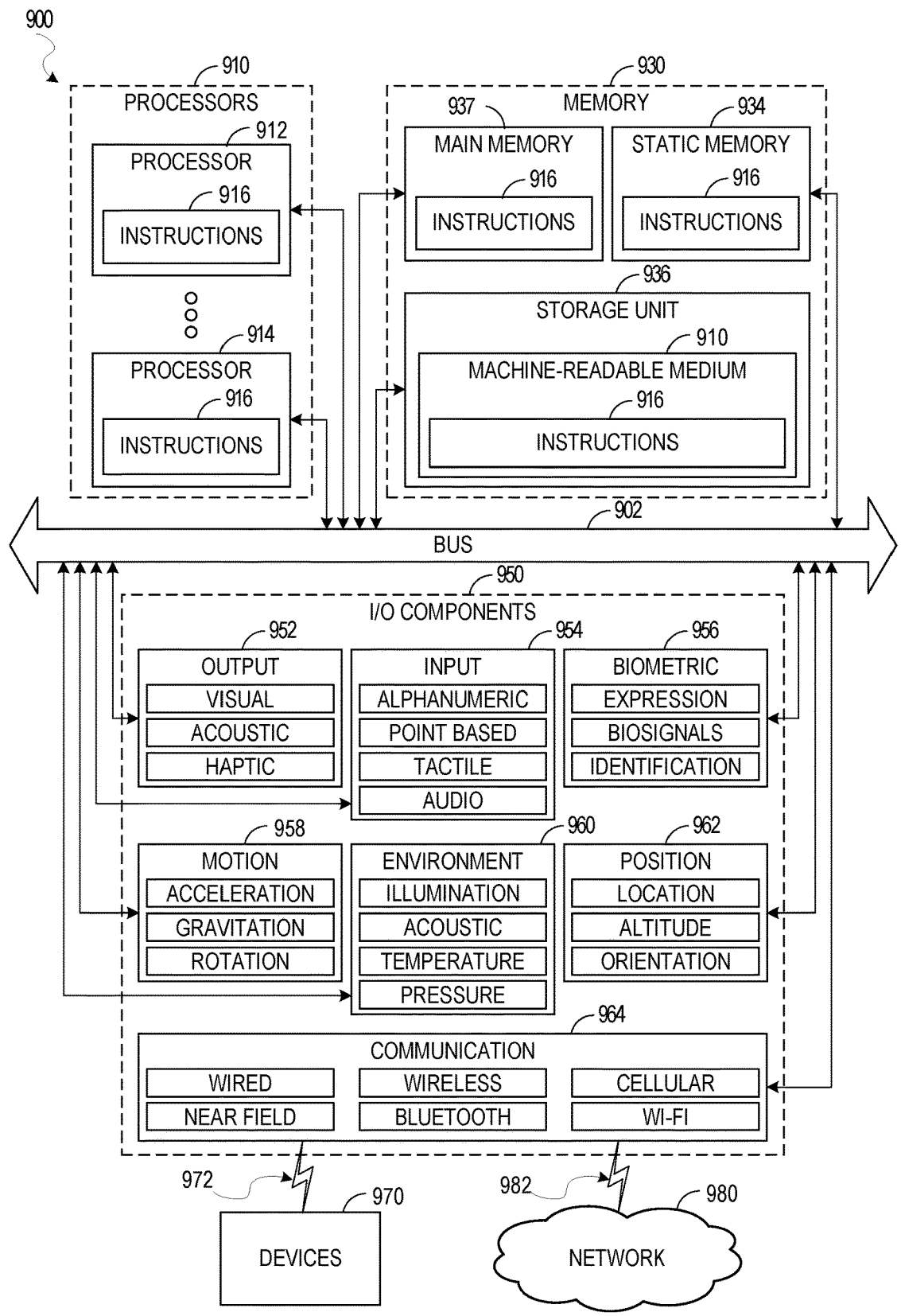
FIG. 8 illustrates a diagrammatic representation of a machine in the form of a computer system within which a set of instructions may be executed for causing the machine to perform any one or more of the methodologies discussed herein, according to an example embodiment.

FIG. 8 illustrates a diagrammatic representation of a machine 900 in the form of a computer system within which a set of instructions may be executed for causing the machine to perform any one or more of the methodologies discussed herein, according to an example embodiment. Specifically, FIG. 8 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute any one of the methods or algorithmic techniques described herein. Additionally, or alternatively, the instructions 916 may implement any one of the systems described herein. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 8 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936, all accessible to the processors 910 such as via the bus 902. The main memory 930, the static memory 934, and storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 8. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 932, 934, and/or memory of the processor(s) 910) and/or storage unit 936 may store one or more sets of instructions and data structures (e.g., software) embodying or utilized by any one or more of the methodologies or functions described herein. These instructions (e.g., the instructions 916), when executed by processor(s) 910, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A computer-implemented method comprising:
generating a plurality of approximate nearest neighbor ("aNN") indexes, each aNN index storing content item embeddings for content items associated with one end-user of a feed of an online service;
at a candidate selection module, receiving a request to obtain a number "k" of content items for presentation to a first end-user of the feed, the request including a query embedding representing the first end-user and data identifying other end-users of the online service who are connections or follows of the first end-user;
generating, by the candidate selection module, an intermediate set of content items by adding to the intermediate set a content item selected from each aNN index associated with an end-user of the online service who is a connection or follow of the first end-user, each content item selected for adding to the intermediate set representing the content item in its respective index having the highest similarity score, the similarity score based on a measure of distance between the query embedding and a content item embedding representing the content item;
iteratively performing operations, by the candidate selection module, to add content items to a result set until the number of content items in the result set is equal to "k," the operations including:
moving, from the intermediate set of content items to the result set, the content item in the intermediate set having the highest similarity score; and
updating the intermediate set of content items by adding to the intermediate set a content item selected from the aNN index from which the last content item moved to the result set was selected; and
ranking, by a ranking module, the content items in the result set; and
selecting a subset of ranked content items for presentation to the first end-user via a user interface of the feed.

2. The computer-implemented method of claim 1, wherein said steps of i) generating the intermediate set of content items, ii) moving the content item in the intermediate set having the highest similarity score, and iii) updating the intermediate set of content items by adding to the intermediate set a content item selected from the aNN index from which the last content item moved to the result set was selected, are performed using a priority queue.

3. The computer-implemented method of claim 1, wherein said step of updating the intermediate set of content items by adding to the intermediate set a content item selected from the aNN index from which the last content item moved to the result set was selected is performed only when the number of content items selected from the aNN index from which the last content item moved to the result set was selected is less than a threshold value.

4. The computer-implemented method of claim 3, wherein the threshold value is expressed as a number or as percentage of the number, "k."

5. The computer-implemented method of claim 1, wherein the content item embeddings stored in each aNN index are associated with an activity, of a single activity type, undertaken by an end-user of a feed of an online service.

6. The computer-implemented method of claim 1, wherein the query embedding and each content item embedding are derived in the same embedding space, and the similarity score for a content item is based on the Cosine distance between the query embedding and the content item embedding for the content item.

7. The computer-implemented method of claim 1, wherein the query embedding and each content item embedding are derived in the same embedding space, and the similarity score for a content item is based on a calculation of the inner product for the query embedding and the content item embedding for the content item.

8. The computer-implemented method of claim 1, wherein an activity undertaken by an end-user of a feed of an online service is of an activity type comprising one of:
posting a content item to the feed;
commenting on a content item previously posted to the feed;
liking a content item previously posted to the feed; or
sharing a content item previously posted to the feed.

9. A system comprising:
a processor configured to execute computer-readable instructions; and
a memory storage device storing computer-readable instructions thereon, which, when executed by the processor, cause the system to perform operations comprising:
generating a plurality of approximate nearest neighbor ("aNN") indexes, each aNN index storing content item embeddings for content items associated with one end-user of a feed of an online service;
at a candidate selection module, receiving a request to obtain a number "k" of content items for presentation to a first end-user of the feed, the request including a query embedding representing the first end-user and data identifying end-users of the online service who are connections or follows of the first end-user;
generating, by the candidate selection module, an intermediate set of content items by adding to the intermediate set a content item selected from each aNN index associated with an end-user of the online service who is a connection or follow of the first end-user, each content item selected for adding to the intermediate set representing the content item in its respective index having the highest similarity score, the similarity score based on a measure of distance between the query embedding and a content item embedding representing the content item;
iteratively performing operations, by the candidate selection module, to add content items to a result set until the number of content items in the result set is equal to "k," the operations including:
moving, from the intermediate set of content items to the result set, the content item in the intermediate set having the highest similarity score; and
updating the intermediate set of content items by adding to the intermediate set a content item selected from the aNN index from which the last content item moved to the result set was selected; and
ranking, by a ranking module, the content items in the result set; and
selecting a subset of ranked content items for presentation to the first end-user via a user interface of the feed.

10. The system of claim 9, further comprising a priority queue to perform said steps of i) generating the intermediate set of content items, ii) moving the content item in the intermediate set having the highest similarity score, and iii) updating the intermediate set of content items by adding to the intermediate set a content item selected from the aNN index from which the last content item moved to the result set was selected.

11. The system of claim 9, wherein said step of updating the intermediate set of content items by adding to the intermediate set a content item selected from the aNN index from which the last content item moved to the result set was selected is performed only when the number of content items selected from the aNN index from which the last content item moved to the result set was selected is less than a threshold value.

12. The system of claim 9, wherein the threshold value is expressed as a number or as percentage of the number, "k."

13. The system of claim 9, wherein the content item embeddings stored in each aNN index are associated with an activity, of a single activity type, undertaken by an end-user of a feed of an online service.

14. The system of claim 9, wherein the query embedding and each content item embedding are derived in the same embedding space, and the similarity score for a content item is based on the Cosine distance between the query embedding and the content item embedding for the content item.

15. The system of claim 9, wherein the query embedding and each content item embedding are derived in the same embedding space, and the similarity score for a content item is based on a calculation of the inner product for the query embedding and the content item embedding for the content item.

16. The system of claim 9, wherein an activity undertaken by an end-user of a feed of an online service is of an activity type comprising one of:
posting a content item to the feed;
commenting on a content item previously posted to the feed;
liking a content item previously posted to the feed; or
sharing a content item previously posted to the feed.

17. A system comprising:
means for generating a plurality of approximate nearest neighbor ("aNN") indexes, each aNN index storing content item embeddings for content items associated with an end-user of a feed of an online service;
means for receiving, at a candidate selection module, a request to obtain a number "k" of content items for presentation to the first end-user of the feed, the request including a query embedding representing the first end-user and data identifying end-users of the online service who are connections or follows of the first end-user;
means for generating an intermediate set of content items by adding to the intermediate set a content item selected from each aNN index associated with an end-user of the online service who is a connection or follow of the first end-user, each content item selected for adding to the intermediate set representing the content item in its respective index having the highest similarity score, the similarity score based on a measure of distance between the query embedding and a content item embedding representing the content item;
means for iteratively performing operations, by the candidate selection module, to add content items to a result set until the number of content items in the result set is equal to "k," the operations including:
moving, from the intermediate set of content items to the result set, the content item in the intermediate set having the highest similarity score; and
updating the intermediate set of content items by adding to the intermediate set a content item selected from the aNN index from which the last content item moved to the result set was selected; and
means for ranking, by a ranking module, the content items in the result set; and means for selecting a subset of ranked content items for presentation to the first end-user via a user interface of the feed.

18. The system of claim 17, further comprising means for deploying a priority queue to perform said steps of i) generating the intermediate set of content items, ii) moving the content item in the intermediate set having the highest similarity score, and iii) updating the intermediate set of content items by adding to the intermediate set a content item selected from the aNN index from which the last content item moved to the result set was selected.

19. The system of claim 17, wherein the threshold value is expressed as a number or as percentage of the number, "k."

20. The system of claim 17, wherein the content item embeddings stored in each aNN index are associated with an activity, of a single activity type, undertaken by an end-user of a feed of an online service.

* * * * *